Figure 9:
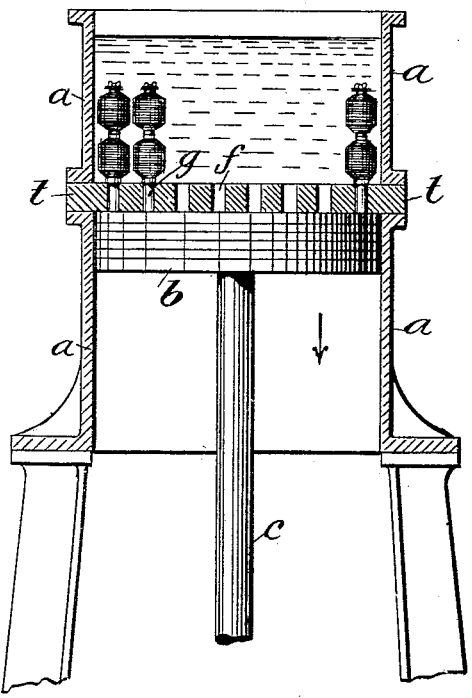

No. 704,191. Patented July 8, 1902.
R. ILLINGWORTH, J. T. MAZEY & G. NAYLOR.
APPARATUS FOR DYEING.
(Application filed Jan. 18, 1902.)
(No Model.) 2 Sheets—Sheet I.
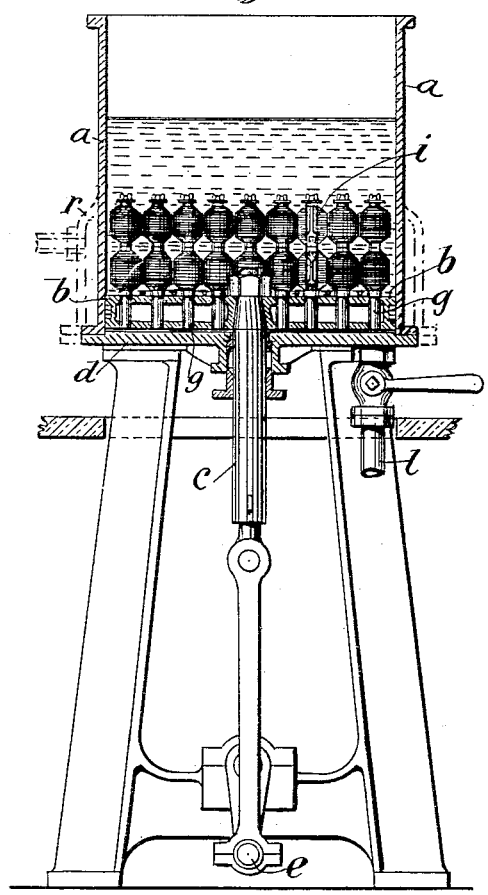
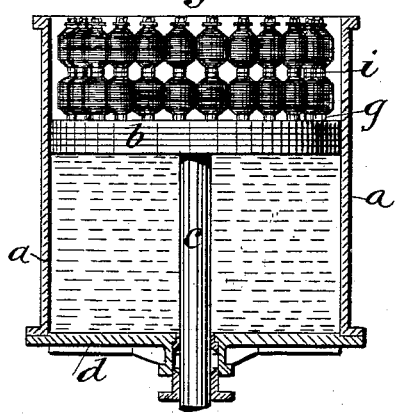
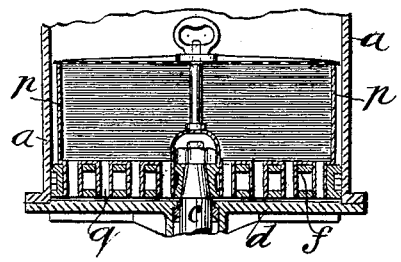
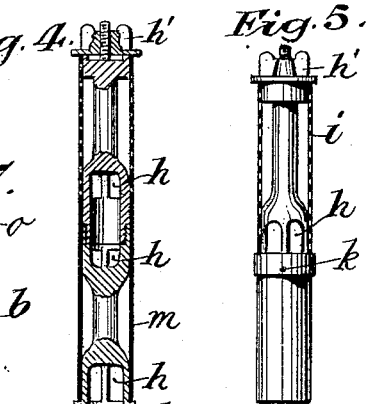
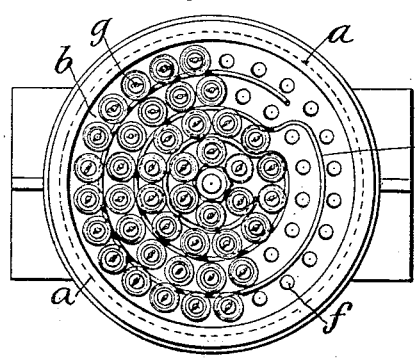
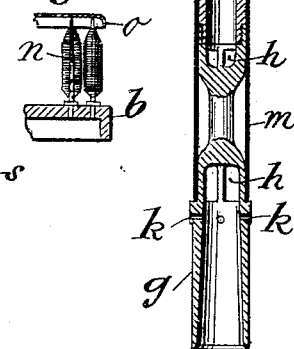
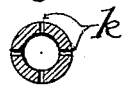
WITNESSES
Isabella Haldron
Adelaide Claire Gleason
INVENTORS
Rochester Illingworth
John Thomas Mazey
George Naylor
BY Richards & Co
ATTORNEYS
THE NORRIS PETERS CO., PHOTO-LITHO., WASHINGTON, D. C.

No. 704,191. Patented July 8, 1902.
R. ILLINGWORTH, J. T. MAZEY & G. NAYLOR.
APPARATUS FOR DYEING.
(Application filed Jan. 18, 1902.)

(No Model.) 2 Sheets—Sheet 2.

WITNESSES
Isabella Waldron
Adelaide Claire Gleason

INVENTORS.
Rochester Illingworth
John Thomas Mazey
George Naylor
BY Richards & Co
ATTORNEYS.

UNITED STATES PATENT OFFICE.

ROCHESTER ILLINGWORTH, JOHN THOMAS MAZEY, AND GEORGE NAYLOR, OF COVENTRY, ENGLAND.

APPARATUS FOR DYEING.

SPECIFICATION forming part of Letters Patent No. 704,191, dated July 8, 1902.

Application filed January 18, 1902. Serial No. 90,309. (No model.)

*To all whom it may concern:*

Be it known that we, ROCHESTER ILLINGWORTH, JOHN THOMAS MAZEY, and GEORGE NAYLOR, subjects of the King of Great Britain, residing at Coventry, in the county of Warwick, England, (whose post-office addresses are Hill street, 43 Foleshill road, and Highbury Place, respectively, all of Coventry aforesaid,) have invented new and useful Improvements in Apparatus for Dyeing and Otherwise Treating Fibrous Material in a Spun or other State, (for which we have made application for a patent in Great Britain, No. 9,720, dated May 10, 1901,) of which the following is a specification.

Our invention relates to improvements in apparatus for dyeing and otherwise treating fibrous material in a spun or other state, and the object is to provide means whereby such operations are performed in a more simple and efficient manner than hitherto has been the case and perfect regularity and uniformity in shade of the material treated is obtained. We attain these objects by the mechanism illustrated in the accompanying two sheets of drawings, in which—

Figures 1 and 3 are vertical sections, and Fig. 2 a plan of Fig. 1, of an apparatus constructed in accordance with our invention. Figs. 4, 5, and 6 are views of details, and Figs. 7, 8, and 9 vertical sections of modifications, of our invention.

Similar letters refer to similar parts throughout the several views.

In carrying out our invention and referring to Figs. 1, 2 and 3 we employ a vessel $a$, preferably cylindrical, of suitable size, open at the top and closed at the bottom and adapted to receive the liquor necessary for the treatment of the fibrous material. This vessel contains a piston $b$, adapted to reciprocate therein, the rod $c$ of which may pass through the bottom cover $d$ of the cylinder and is made liquor and air tight therein by the usual gland and stuffing-box and the piston itself fitted with packing-rings which render it liquor and air tight in the said cylinder. This piston may be reciprocated, as shown in the drawings—say by a crank $e$ or any other suitable means—say by a screw and rotating nut or by hydraulic pressure, as will be readily understood. Through this piston we form a suitable number of holes $f$, which when the apparatus is used for dyeing or otherwise treating the fibrous material—for instance, in cheese or the like compact form, as shown in Figs. 1, 2, and 3—are each fitted with a hollow spindle or pillar $g$, formed with lateral apertures $h$ and closed at the top end by a nut $h'$, screwed onto the same. (See also Figs. 4, 5, and 6.) These hollow spindles or pillars project from the upper side of the said piston and are each adapted to receive one or more superposed perforated tubes $i$—say two, as shown in Fig. 1—upon which the fibrous material to be treated has previously been wound in cheese or the like compact form. Immediately above the upper side of the said piston the said spindles or pillars are formed crosswise with ports $k$, (see more particularly Figs. 4 and 6,) through which a small portion of the liquor is allowed to squirt for the purpose of keeping the bulk of the liquor agitated and thus prevent sediment forming. These ports also allow of completely draining the cylinder of the liquor above the piston, the same passing through the piston into the vessel-space below, from whence all the liquor can be carried off by the pipe $l$, secured to the cylinder-bottom cover $d$, when necessary.

In lieu of using a spindle or pillar adapted to hold two or more cheeses, as described, a spindle or pillar may be used to hold only one cheese, as shown in Fig. 5, or, again, the double cheese spindle or pillar shown in Fig. 1 may be converted into a single one by placing a blank tube $m$ over the bottom portion thereof, as shown in Fig. 4.

When using the apparatus for treating fibrous material wound in cop or the like form, the holes $f$ in the piston are made smaller, as shown in Fig. 7, and perforated spindles $n$ are used, carrying the cops and adapted to be placed into the said holes. The said spindles may be prevented from leaving the piston when forcing the liquor through the same by a plate $o$, removably secured to the piston $b$.

When using the apparatus for dyeing or otherwise treating fibrous material—say in the hank, warp, or in a manufactured state— we dispense with the said spindles or pillars and use in lieu thereof a removable cage $p$, (see Fig. 8,) having at its bottom nozzles $q$, adapted to engage in the piston-holes $f$, into which cage $p$ the material to be treated is suitably packed.

In order to permit of heating the liquor in the vessel, we form the same with a steam-jacket $r$, as shown in dotted lines, Fig. 1, or employ a steam-coil $s$ on the top of the piston, (see full lines,) as may be found most convenient.

The action of the apparatus described when used for the treatment of fibrous material in cop, cheese, or the like compact form is as follows: Assuming the piston $b$ is in its lowest position, as shown in Fig. 1, and the liquor above the same, on the upstroke of the piston a vacuum is created below in the vessel, and the liquor is thereby drawn from the outside to the inside of the fibrous material, the said perforated tubes, spindles or pillars, and piston into the space in the vessel below the piston, as shown in Fig. 3. On the return stroke of the piston the liquor in the space below the piston is forced through the latter, the said spindles or pillars, and perforated tubes, through the fibrous material on the latter, from the inside to the outside thereof, back into the space in the vessel above the piston, as shown in Fig. 1. This action repeats itself alternately at every up-and-down stroke of the piston, so that the liquor is alternately circulated through the fibrous material, from the outside to the inside and then from the inside to the outside thereof, which gives absolute regularity and uniformity in the shade of the material treated. When dispensing with the said spindles or pillars and placing the fibrous material to be treated in a cage, as previously described, the action of the apparatus is practically the same—that is to say, on the upstroke of the piston the liquor is drawn from above the piston through the said cage and fibrous material therein and piston into the space in the vessel below the piston and on the return or down stroke forced back through the piston, cage, and fibrous material in the latter into the space in the vessel above the piston.

Although we have shown the vessel containing the piston as cylindrical, it will be understood that its section may be varied without departing from the nature of our invention.

According to a modification of our invention, Fig. 9, we may form the vessel $a$ open both at the top and bottom and with a partition $t$ serving for the reception of the spindles or pillars $g$ or a cage $p$, such as shown in Fig. 5. In this case the liquor is drawn from the outside to the inside of the fibrous material under treatment on the downstroke and forced from the inside to the outside on the upstroke of the piston $b$.

What we claim as our invention, and desire to secure by Letters Patent, is—

1. An apparatus for dyeing comprising a vessel for containing the dyeing liquor, a piston reciprocating therein, hollow pillars carried by said piston having lateral apertures and perforated tubes upon which the material to be treated is wound removably carried by said pillars, substantially as described.

2. An apparatus for dyeing comprising a vessel for containing the dyeing liquor, a piston reciprocating therein, hollow pillars carried by said piston having spool-shaped upper ends, perforated tubes removably seated upon the spool-shaped portions of said pillars, said pillars having lateral apertures, and caps removably secured upon the upper ends of the pillars and abutting against the upper edges of the tubes, substantially as described.

3. An apparatus for dyeing comprising a vessel for containing the liquor, a piston reciprocating therein, hollow pillars carried by the said piston and having cross-ports immediately above the upper sides of the said piston, the said hollow pillar and cross-ports communicating with the vessel on the opposite side of the piston from that upon which they are located, substantially as described.

In witness whereof we have hereunto set our hands in presence of two witnesses.

ROCHESTER ILLINGWORTH.
JOHN THOMAS MAZEY.
GEORGE NAYLOR.

Witnesses:
CHAS. E. DOLPHIN,
ERNEST OVERTON.